United States Patent Office 3,200,158
Patented Aug. 10, 1965

3,200,158
BIS-(PERFLUOROALKYL) NITROXIDE
William D. Blackley, Wappingers Falls, N.Y., assignor to Texaco Inc., New York, N.Y., a corporation of Delaware
No Drawing. Filed Feb. 7, 1964, Ser. No. 343,467
8 Claims. (Cl. 260—647)

This invention relates to novel stable paramagnetic (free radical) compounds. More specifically it is directed to the bis-(perfluoroalkyl) nitroxides and to their method of manufacture.

The nitroxide compounds of the invention being paramagnetic in nature are useful as inhibitors in polymerization reactions, and therefore, they find particular suitability as stabilizers in amounts of between about 0.001 and 2.0 wt. percent in nylon and rubber compositions.

The bis-(perfluoroalkyl) nitroxide compounds contemplated herein are further described by the formula:

$$(R_f)_2NO \cdot$$

where $R_f$ is a perfluoro saturated aliphatic radical (perfluoroalkyl) of from 1 to 12 carbons. Specific examples of the nitroxide compounds of the invention are bis-(trifluoromethyl) nitroxide, bis-(perfluoroethyl) nitroxide, bis-(perfluoro-t-butyl) nitroxide, bis-(perfluoro-2-methylhexyl) nitroxide, bis-(perfluoroheptyl) nitroxide, and bis-(perfluorododecyl) nitroxide.

The contemplated nitroxides are prepared by contacting bis-(fluoroalkyl) hydroxylamine of the formula:

$$(R_f)_2NOH$$

where $R_f$ is as heretofore defined with an oxidizing agent selected from the group consisting of fluorine, silver oxide and mercuric oxide. The reaction can be further described by the following equations:

(a) $2(R_f)_2NOH + F_2 \rightarrow 2(R_f)_2NO \cdot + 2HF$
(b) $2(R_f)_2NOH + Ag_2O \rightarrow 2(R_f)_2NO \cdot + 2Ag + H_2O$
(c) $2(R_f)_2NOH + HgO \rightarrow 2(R_f)_2NO \cdot + Hg + H_2O$ $R_f$ is as heretofore defined.

Although the proportion of reactants to one another may vary widely, the reaction is advantageously conducted utilizing a mole ratio of oxidizing agent to hydroxylamine reactant of between about 1:1 and 4:1.

When fluorine is the reactant, reaction temperatures between about −100 and +100° C., preferably between −80 and +25° C., are normally employed. Further since fluorine is a very strong oxidizing agent, under preferred conditions an inert gas, such as nitrogen, is employed to dilute the fluorine gas in order to render the reaction more controllable. In addition, as can be seen from the foregoing Equation "a" when fluorine is the oxidizing agent, highly toxic and corrosive hydrogen fluoride is a by-product. Therefore, under preferred conditions an alkali metal fluoride such as sodium fluoride is added to the reaction mixture to react with the hydrogen fluoride by-product to form an alkali metal hydrogen difluoride, e.g., NaHF₂. A mole ratio of between about 1:1 and 5:1 alkali metal fluoride to hydroxylamine reactant is desirably employed.

When silver oxide or mercuric oxide is utilized as the oxidizing agent, reaction temperatures substantially higher than those employed with fluorine are used since the metal oxides are relatively weaker oxidizing agents. When the metal oxides are employed, the reaction temperatures are desirably between about 90 and 250° C., although higher and lower temperatures may be used.

The nitroxide product is recovered from the final reaction mixture by standard means such as by fractional distillation, by fractional condensation, or by combinations thereof. The particular method of recovery depends on the physical state of the material to be recovered.

Specific examples of the bis-(perfluoroalkyl) hydroxylamine reactants contemplated herein are bis-(trifluoromethyl) hydroxylamine, bis-(perfluoroethyl) hydroxylamine, bis-(perfluoro-t-butyl) hydroxylamine, bis-(fluoro-2-methylhexyl) hydroxylamine, bis-(perfluoroheptyl) hydroxylamine, and bis-(perfluorododecyl) hydroxylamine.

In the manufacture of the nitroxide compounds of the invention relatively inert apparatus materials should be utilized when highly corrosive fluorine is employed. Suitable materials are stainless steel and alloys of high nickel content such as Monel metal.

In addition to the foregoing method of preparation alternative methods may be employed such as ultraviolet irradiation of an perfluoroalkanonyl nitrite to form the bis-(perfluoroalkyl) nitroxide product. Specific examples of the alkanoylnitrites contemplated herein are propanoyl nitrite, octanoylnitrite and decanoylnitrite.

The following examples further illustrate the invention but are not to be taken as limitations thereof.

*Example I*

To a 50 cc. stainless steel reactor there was added 2 grams of dry powdered sodium fluoride, 2 grams of bis-(trifluoromethyl) hydroxylamine, condensed in the bottom of the reactor. The reactor and associated stainless steel system (sodium fluoride scrubber and U-trap connected to the reactor in sequence), maintained at a temperature −183° C., was flushed with dry nitrogen. The reactor was warmed to −78° C. as a gaseous fluorine-nitrogen mixture (10 cc./min. F₂ and 60 cc./min. N₂) was passed over the hydroxylamine reactant. After 107 minutes the fluorine flow was increased to 20 cc./minute while the nitrogen flow was maintained at 60 cc./minute. After a total of 2 hours the fluorination was discontinued and the system was flushed with nitrogen. The U-trap was cooled to −196° C. and the gases in system were evacuated thereby removing fluorine and non-condensables. The solid contents of the U-trap gave an intensely purple gas at room temperature. Analysis of the purple gas found it to be of the following composition: 1.25 wt. percent CF₄, 1 wt. percent CF₃NO₂, 95 wt. percent (CF₃)₂NO, 2.25 wt. percent (CF₃)₂NOCF₃ and 0.5% unidentified products.

The recovered (CF₃)₂NO, confirmed to be bis-(trifluoromethyl) nitroxide by spectrographic analysis, had a boiling point of −25° C. and a melting point of −70° C. Further, it is a purple gas at room temperature, a brown liquid at −60° C. and a yellow solid at −196° C. Still further, it reacts quickly with other paramagnetic compounds such as NO and NO₂, has a heat of dimerization of −2570 calories, is stable in all common materials of construction such as glass, copper, and stainless steel, and is unreactive with air, water, 10% sulfuric acid, 10% sodium hydroxide, mercury, CFCl₃, and benzene.

*Example II*

Through a 10 cc. Pyrex tube filled with silver oxide and maintained at a temperature of between 180 and 200° C. there were passed 4.4 grams of bis-(trifluoromethyl) hydroxylamine. The reaction products withdrawn from the tube were collected in cold traps. A −22° C. bath gave unreacted (CF₃)₂NOH and H₂O. The material passing through the −220° C. trap was collected as a yellow solid in a trap maintained at −196° C. by a liquid nitrogen bath. Infrared analysis determined the yellow solid to be bis-(trifluoromethyl) nitroxide in a yield of over 90 wt. percent based on the hydroxylamine reactant.

Example III

This example demonstrates the criticality of a procedure of the invention.

Chlorine was substituted for fluorine and the procedure of Example I was essentially repeated at room temperature. No reaction was observed even in the presence of a great excess of chlorine together with irradiation with ultraviolet light.

Example IV

To a Vycor flask there was added 5 grams of octoyl-nitrite of the formula:

$$n\text{-}C_7H_{15}COONO$$

The flask was stoppered and irradiated with ultraviolet light. At the end of the irradiation period the liquid product material was analyzed and found through its electron spin resonance pattern to be bis-(perfluoroheptyl) nitroxide of the formula:

$$(n\text{-}C_7H_{15})_2NO\cdot$$

I claim:

1. A paramagnetic compound of the formula:

$$(R_f)_2NO\cdot$$

where $R_f$ is a perfluoro alkyl radical of from 1 to 12 carbons.

2. Bis-(trifluoromethyl) nitroxide.
3. Bis-(perfluoroheptyl) nitroxide.
4. A method of preparing a paramagnetic compound of the formula:

$$(R_f)_2NO\cdot$$

where $R_f$ is a perfluoroalkyl radical of 1 to 12 carbons comprising contacting a hydroxylamine compound of the formula:

$$(R_f)_2NOH$$

where $R_f$ is as heretofore defined with an oxidizing agent selected from the group consisting of fluorine, silver oxide, and mercuric oxide.

5. A method in accordance with claim 4 wherein said oxidizing agent is fluorine and said contacting is conducted at a temperature between about $-100$ and $+100°$ C. in a mole ratio of said fluorine to said hydroxylamine of between about 1:1 and 4:1.

6. A method in accordance with claim 5 wherein $R_f$ is a trifluoromethyl.

7. A method in accordance with claim 4 wherein said oxidizing agent is silver oxide and said contacting is conducted at a temperature between about 90 to 250° C. in a mole ratio of said silver oxide to said hydroxylamine of between about 1:1 and 4:1.

8. A method in accordance with claim 7 where $R_f$ is trifluoromethyl.

References Cited by the Applicant

Yakubovich et al.: 56 Chem. Abs., 11429C.

Inside of back cover of Feb. 11, 1963, Chemical and Engineering News.

CARL D. QUARFORTH, *Primary Examiner.*